United States Patent
Pilard et al.

(10) Patent No.: US 8,493,832 B2
(45) Date of Patent: Jul. 23, 2013

(54) OPTICAL STORAGE MEDIUM HAVING DIFFERENT DIMENSION OF RECORDED MARKS AND SPACES ON DIFFERENT TRACKS

(75) Inventors: Gael Pilard, Reutlingen (DE); Herbert Hoelzemann, Villingen (DE); Alois Kern, Villingen-Schwenningen (DE); Frank Przygodda, Friedrichshafen (DE); Stephan Knappmann, Zimmern OB Rottweil (DE)

(73) Assignee: Thomson Licensing, LLC, Issy les Moulineaux (FR)

( * ) Notice: Subject to any disclaimer, the term of this patent is extended or adjusted under 35 U.S.C. 154(b) by 0 days.

(21) Appl. No.: 13/138,905

(22) PCT Filed: Apr. 26, 2010

(86) PCT No.: PCT/EP2010/055510
§ 371 (c)(1),
(2), (4) Date: Jan. 25, 2012

(87) PCT Pub. No.: WO2010/125015
PCT Pub. Date: Nov. 4, 2010

(65) Prior Publication Data
US 2012/0124601 A1  May 17, 2012

(30) Foreign Application Priority Data

Apr. 28, 2009 (EP) .................................... 09305364
Jul. 23, 2009 (EP) .................................... 09305699

(51) Int. Cl.
*G11B 7/24* (2006.01)
(52) U.S. Cl.
USPC ...................................................... 369/275.4

(58) Field of Classification Search
USPC .......... 369/275.4, 275.3, 275.1, 275.2, 275.5, 369/280–288; 428/64.1, 64.2, 64.4; 430/321, 430/320, 270.1, 270.11, 270.13; 720/718
See application file for complete search history.

(56) References Cited

U.S. PATENT DOCUMENTS

| 5,740,141 | A | * | 4/1998 | Sano et al. ................. 369/59.15 |
| 7,804,752 | B2 | * | 9/2010 | Weirauch .................. 369/275.4 |
| 2004/0190432 | A1 | * | 9/2004 | Ichihara et al. ............ 369/275.4 |
| 2005/0286401 | A1 | * | 12/2005 | Oyake et al. ............... 369/275.4 |
| 2007/0008840 | A1 | | 1/2007 | Martens et al. |

(Continued)

FOREIGN PATENT DOCUMENTS

| EP | 1372143 | 12/2003 |
| EP | 1968048 | 9/2008 |
| EP | 2009626 | 12/2008 |
| EP | 2040255 A2 | 3/2009 |
| WO | WO2008046777 | 4/2008 |

OTHER PUBLICATIONS

Search Reports dated (EP) Oct. 20, 2009; (PCT) Jun. 30, 2010.

*Primary Examiner* — Tan X Dinh
(74) *Attorney, Agent, or Firm* — International IP Law Group, PLLC

(57) ABSTRACT

The optical storage medium comprises a substrate layer and a data layer disposed on the substrate layer, the data layer having a mark/space data structure being arranged in tracks, wherein on a first track, the marks are enlarged in length and the spaces are shortened in length, and on an adjacent track, the marks are shortened in length and the spaces are enlarged in length. The track pitch between adjacent tracks is particularly below a diffraction limit of $\lambda/2*NA$ of a pickup for reading of the data.

10 Claims, 4 Drawing Sheets

U.S. PATENT DOCUMENTS

| | | |
|---|---|---|
| 2007/0121461 A1 | 5/2007 | Kobayashi |
| 2007/0280095 A1* | 12/2007 | Yoshida et al. ............ 369/275.4 |
| 2008/0285431 A1 | 11/2008 | Minemura et al. |
| 2011/0276991 A1* | 11/2011 | Pilard et al. ................ 369/275.4 |

* cited by examiner

OPTICAL STORAGE MEDIUM HAVING DIFFERENT DIMENSION OF RECORDED MARKS AND SPACES ON DIFFERENT TRACKS

This application claims the benefit, under 35 U.S.C. §365 of International Application PCT/EP2010/055510, filed Apr. 26, 2010, which was published in accordance with PCT Article 21(2) on Nov. 4, 2010 in English and which claims the benefit of European patent application No. 09305364.3, filed Apr. 28, 2009 and European patent application No. 09305699.2, filed Jul. 23, 2009.

TECHNICAL FIELD OF THE INVENTION

The present invention relates to an optical storage medium, which comprises a substrate layer, a data layer with a mark/space structure, for example a read-only data layer with a pit/land structure, arranged in tracks on the substrate layer, and to a respective apparatus for reading of data. In a preferred embodiment, the optical storage medium comprises a non-linear layer with a super resolution structure for storing of data with high data density.

BACKGROUND OF THE INVENTION

Optical storage media are media in which data are stored in an optically readable manner by means of a pickup including a laser and an optical detector, for example a photodetector. The detector is used for detecting reflected light of the laser beam when reading data on the storage medium. In the meanwhile a large variety of optical storage media are known, which are operated with different laser wavelength, and which have different sizes for providing storage capacities from below one Gigabyte up to 50 Gigabyte (GB). The formats include read-only formats such as Audio CD and Video DVD, write-once optical media such as CD-R and DVD-R, DVD+R, as well as rewritable formats like CD-RW, DVD-RW and DVD+RW. Digital data are stored on these media along tracks in one or more layers of the media.

The storage medium with the highest data capacity is at present the Blu-ray disc (BD), which allows to store up to about 50 GB on a dual layer disc. For reading and writing of a Blu-ray disc a pickup with a laser wavelength of 405 nm and a numerical aperture of 0.85 is used. On the Blu-ray disc a track pitch of 320 nm and a mark length from 2T to 8T or 9T is implemented, where T is the channel bit length and wherein 2T corresponds with a minimum mark length of 138-160 nm.

The spatial resolution limit of optical instruments as described by the Abbe theory is about $\lambda/2NA$, which is 238 nm for a Blu-ray type pickup having a laser wavelength $\lambda=405$ nm and a numerical aperture NA=0.85. 238 nm represents here the period of the smallest detectable mark frequency, period which is constituted of a pit and of a land of the same length. $\lambda/2NA$ is also called the diffraction limit and corresponds with the focus diameter of the laser beam on the optical disc. It corresponds finally to a theoretically smallest detectable mark (pit or land) of 119 nm (in regard to a Blu-ray optic), or related to the wavelength and the numerical aperture, a smallest detectable mark (pit or land) of $\lambda/4NA=119$ nm.

New optical storage media with a super-resolution structure offer the possibility to increase the data density of the optical storage medium by a factor of two to four in one dimension as compared with the Blu-ray disc. This is possible by including a nonlinear layer, which is placed above the data layer of the optical storage medium, and which significantly reduces the effective size of a light spot used for reading from or writing to the optical storage medium. The nonlinear layer can be understood as a mask layer because it is arranged above the data layer and for some specific materials only the high intensity center part of a laser beam can penetrate the mask layer. Further, semiconductor materials can be used as a nonlinear layer, e.g. InSb, which show a higher reflectivity in the center part of the focused laser beam, and which center reflectivity is dependent on the pit structure of the corresponding data layer. Therefore, the super-resolution effect allows to record and read data stored in marks of an optical disc, which have a size below the diffraction limit of $\lambda/4NA$ of a corresponding optical pickup.

The nonlinear layer is often called a super-resolution near-field structure (Super-RENS) layer because it is assumed that for some specific materials, the optical effect of reducing the effective spot size of the laser beam is based on a near-field interaction between the marks and spaces of the data layer and the nonlinear layer. Super-RENS optical discs comprising a super resolution near-field structure formed of a metal oxide, a polymer compound or a phase change layer comprising a GeSbTe or a AgInSbTe are known.

In WO03034412 an optical storage medium is disclosed including a data layer having substantially parallel tracks being arranged in groups, wherein each group includes at least a first track having broad marks and at least a second track having narrow marks of a second width smaller than the first width to provide a reduced track pitch. A similar storage medium is disclosed in JP-A-05-182203, which has a track structure with tracks being arranged as two nested spirals.

IN WO 2008/071653, an optical storage medium is described comprising a data layer with a mark/space structure arranged in tracks, wherein a sequence of marks of a first track have a first width, and a sequence of marks of an adjacent track have a second width being different from the first width. The tracks are arranged in particular as one or two spirals, circular rings or segmented circular rings on the storage medium.

SUMMARY OF THE INVENTION

The optical storage medium comprises a substrate layer and a data layer disposed on the substrate layer, the data layer having a mark/space data structure being arranged in tracks, wherein on a first track, the marks are enlarged in length and the spaces are shortened in length, and on an adjacent track, the marks are shortened in length and the spaces are enlarged in length. The structure of the tracks on the optical storage medium is in particular designed such, that for consecutive adjacent tracks, the structure of the marks and spaces changes periodically between marks being enlarged in length and spaces being shortened in length), and marks being shortened in length and spaces being enlarged in length, with regard to a defined channel bit length of a channel modulation code used for storing digital data on the storage medium.

The track structure of the optical storage medium provides a periodical structure for a pickup for reading of the data, which has a periodicity of two times the track pitch between adjacent tracks. The track pitch for the optical storage medium between adjacent tracks can be reduced therefore below a radial resolution limit of the pickup, by still allowing push-/pull tracking regulation for reading of the data of the digital storage medium. The track pitch between adjacent tracks is for example within a range of $\lambda/2*NA$ and $\lambda/4*NA$.

In an aspect of the invention, the marks are enlarged in length and the spaces are shortened in length of a first kind of tracks and the marks are shortened in length and the spaces are enlarged in length of interleaved tracks such, that a push-pull tracking error signal with an amplitude being within an interval of 0.10-0.35 is obtained.

In a further aspect of the invention, the optical storage medium is a read-only optical disc comprising pits and lands as the marks and spaces, and tracks having enlarged pits and reduced lands provide groove-kind tracks having pits and lands representing a pit/land duty-cycle being within an interval of 55%-70% and tracks having reduced pits and enlarged lands provide land-kind tracks having pits and lands representing a land/pit duty-cycle being within an interval of 55%-70%.

The track pitch reduction using a modification of the length of marks and spaces is in particular applicable for super resolution optical discs comprising a nonlinear layer for providing a super-resolution effect, for example Super-RENS ROM discs comprising pits and lands. The track pitch is advantageously below 240 nm for use with a Blue-Ray type pickup having a laser emitting light with a wavelength of e.g. about 405 nm. The invention is applicable also for Blu-Ray discs which has the advantage that no essential modifications are necessary for the pickup. The pit depth will then preferably be chosen in order to maximize the push/pull signal and the track pitch will be chosen in order to establish a stable radial position of the laser spot provided by a pickup on a track for reading of the data, while keeping the inter-track crosstalk at a sufficiently low level.

In a further aspect of the invention, the track having marks being enlarged in length and spaces being shortened in length are arranged as a first spiral on the optical storage medium, and the tracks having marks being shortened in length and spaces being enlarged in length, with regard to a channel modulation code, are arranged as a second spiral on the optical storage medium, the second spiral being interleaved with the first spiral. For reading of the data of the optical storage medium, a laser beam of the pickup moves along the marks and spaces of the first spiral e.g. until the end of the first spiral, and switches then to the second spiral for reading the data of the second spiral.

By increasing in addition the width of the marks which are enlarged in length of the first track, and reducing in addition the width of the marks which are shortened in length of an adjacent track, and for respective consecutive tracks, an additional increase of the amplitude of the tracking error signal can be obtained. The pickup for reading of the data therefore sees a periodic structure of mark-kind tracks, in which the marks are dominant, interleaved with land-kind tracks, which are dominated by land-kind tracks.

An apparatus for reading data from the optical storage medium comprises a pickup with a laser, a detector unit, an objective lens and a data processing unit for decoding data of tracks having marks enlarged in length and spaces shortened in length, and tracks having marks shortened in length and spaces enlarged in length. In a preferred embodiment, the pickup provides a center beam and two satellite beams for providing a HF data signal and a tracking error signal, wherein the three beams are focused by the objective lens onto the optical storage medium, and reflected light from the optical storage medium is guided onto the detector unit. The center beam is adjustable onto a selected track of the optical storage medium (1) for reading of the data, and a first of the satellite beams is adjusted onto a first adjacent track and the second satellite beam is adjusted onto the second adjacent track when the center beam is adjusted onto said track, wherein the intensity of the two satellite beams is each smaller than 50% of the intensity of the main beam.

The detector unit comprises advantageously a center detector for detecting reflected light from the center beam and two satellite detectors for detecting reflected light from the satellite beams, and the two satellite detectors are divided each into two segments. The pickup provides a push-pull tracking signal for tracking regulation in response to the two satellite detectors, or alternatively, provides a push-pull tracking signal for tracking regulation in response to the center detector.

BRIEF DESCRIPTION OF THE DRAWINGS

Preferred embodiments of the invention are explained now in more detail below by way of example with reference to schematic drawings, which show:

FIG. 1 a part of an optical storage medium having a layer stack with a nonlinear layer in a cross-section, FIG. 2 a small area of an optical disc showing marks and spaces of tracks according to prior art, FIG. 3 a track structure with tracks having marks enlarged in length and spaces shortened in length, interleaved with tracks having marks shortened in length and spaces enlarged in length according to the invention, FIG. 4 graphs showing results of simulations for track structures according to the track structure of FIG. 3, FIG. 5 a track structure in accordance with the track structure of FIG. 3, having tracks with marks being in addition enlarged in width and tracks with marks being in addition reduced in width, FIG. 6 graphs showing results of simulations for track structures according to the track structure of FIG. 5, FIGS. 7*a*, 7*b* track structures according to the invention with tracks being represented by one or two spirals on an optical disc, and FIG. 8 an optical detector arrangement of a pickup for providing a differential push-pull tracking regulation.

DETAILED DESCRIPTION OF PREFERRED EMBODIMENTS

Figure 2:
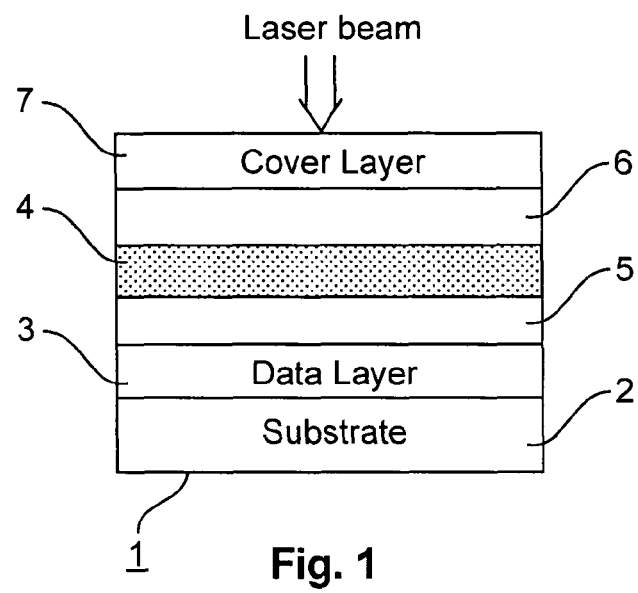

In FIG. 1 an optical storage medium 1 is shown in a cross-section in a simplified manner. The optical storage medium 1 is for example a read-only (ROM) optical disc. A data layer 3 is arranged on a substrate 2 of the optical storage medium 1, which may comprise a reflective metallic layer, for example an aluminum layer. The data layer 3 has a data structure consisting of marks and spaces arranged on essentially parallel tracks. In the case of a ROM disc, the marks and spaces consist of pits and lands, the pits being molded or embossed on the surface of substrate 2 representing the data layer 3, and the reflective metallic layer covers the data layer 3. On the data layer 3 a first dielectric layer 5 is arranged, on which a nonlinear layer 4 is disposed for providing the function of a mask layer for utilizing a super-resolution effect. The nonlinear layer 4 comprises in particular a super-resolution structure, e.g. a super-resolution near-field structure (Super-RENS). The optical storage medium 1 is for example an optical disc having a size similar to a DVDs, CDs and Blu-ray discs.

Above the nonlinear layer 4 a second dielectric layer 6 is disposed. As a further layer, a cover layer 7 is disposed on the second dielectric layer 5 as a protective layer. For reading the data of the data layer 3, a laser beam is applied in this embodiment from the top of the storage medium 1, penetrating first the cover layer 7. The first and second dielectric layers 5, 6 comprise for example the material $ZnS-SiO_2$. The substrate 2 and the cover layer 7 may consist of a plastic material, as known from DVDs and CDs. In other embodiments, the reflective metallic layer may be omitted, when a super-resolution near field structure is used, which does not provide an increase in transmittance due to a heating effect, but works with another nonlinear effect, for example utilizes an effect providing an increased reflectivity of the nonlinear layer 4 when irradiated with a laser beam. The layers of the storage medium 1 are arranged in particular as a layer stack.

With the super-resolution effect, the resolution of a pickup for reading of the data can be increased in track direction, for example by a factor of two to four. This allows a reduction of the size of the marks and spaces of the tracks in track direction. But the super-resolution effect as such does not allow to reduce the track pitch below the diffraction limit of $\lambda/2*NA$ of the pickup. If a push-pull effect is used for the tracking regulation of the pickup, the reduction of the track pitch is limited by the fact that the $1^{st}$ order refracted beams have to be collected by the objective lens of the pickup. Otherwise there is no push-pull signal, because this signal is generated by the interference of the $0^{th}$ order and the $1^{st}$ order beams as reflected from the optical storage medium. For a Blu-ray pickup, this occurs at a track pitch of about 280 nm, the diffraction limit $\lambda/2*NA$ is 238 nm. The standard track pitch of a Blu-ray disc is 320 nm.

A prior art data structure of an optical storage medium, e.g. a Blu-ray disc, is shown in FIG. 1 in a simplified manner. The optical storage medium comprises essentially parallel tracks T1-T4 with same track pitch TP between adjacent tracks. A small part of the optical storage medium is shown in magnification showing marks m and spaces s of the tracks T1-T4. For a Blu-ray disc, a 1.7 PP channel modulation code is used for the data structure and the track pitch TP is 320 nm. With the 1.7 PP channel modulation code, a digital data stream, for example the data stream of a movie, is converted into marks and spaces of a track, the marks and spaces having a size of 2T up to 8T or 9T, wherein T is the channel bit length having a value of 69 nm, 74.5 nm or 80 nm for the Blu-ray disc.

Figure 3:
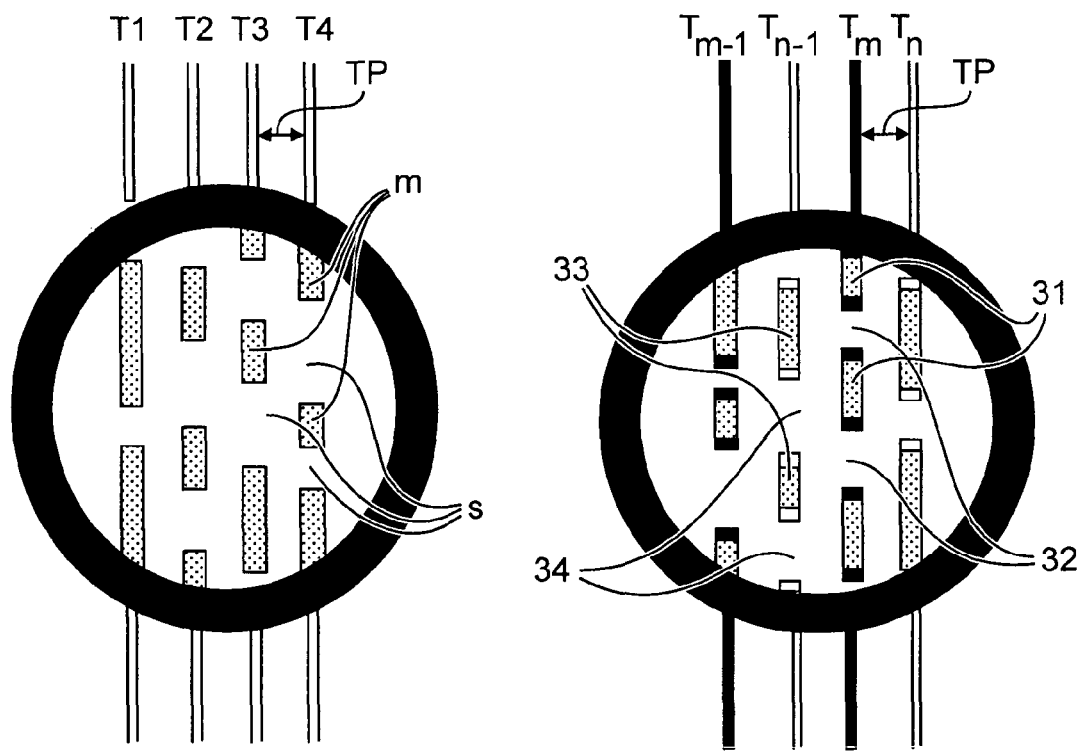

According to the invention, the marks 31 are enlarged in length and the spaces 32 are shortened in length on a first track, e.g. track $T_m$, and the marks 33 are shortened in length and the spaces 34 are enlarged in length on an adjacent track, tracks $T_n$, $T_{n-1}$, with regard to a given channel modulation code, as shown in FIG. 3. Every second track $T_m$, $T_{m+1}$, $T_{m+2}$ etc. comprises therefore enlarged marks and shortened spaces, which tracks are interleaved with tracks $T_n$, $T_{n+1}$, $T_{n+2}$ etc. comprising shortened marks and enlarged spaces. Tracks $T_m$ and tracks $T_{m+1}$ are arranged with a distance of 2 TP, where TP is the track pitch between adjacent tracks $T_n$, $T_m$. The structure of the marks and spaces changes therefore periodically for consecutive adjacent tracks between marks 31 being enlarged in length and spaces 32 being shortened in length and marks 33 being shortened in length and spaces 34 being enlarged in length.

With the track structure as shown in FIG. 3, the track pitch TP between adjacent tracks can be reduced, in particular below the diffraction limit of $\lambda/2*NA$, by still providing a stable tracking regulation. An optical pickup for reading of the data still sees the periodic structure of 2 TP on the optical disc even when the track pitch TP is below the diffraction limit of $\lambda/2*NA$, as long as 2 TP is above the diffraction limit of the pickup, or more specifically, the track pitch TP is large enough to generate a minimum push-pull signal level, e.g. with an amplitude of at least 10%. This allows in theory to increase the data density up to a factor of 2 in radial direction.

Figure 4:
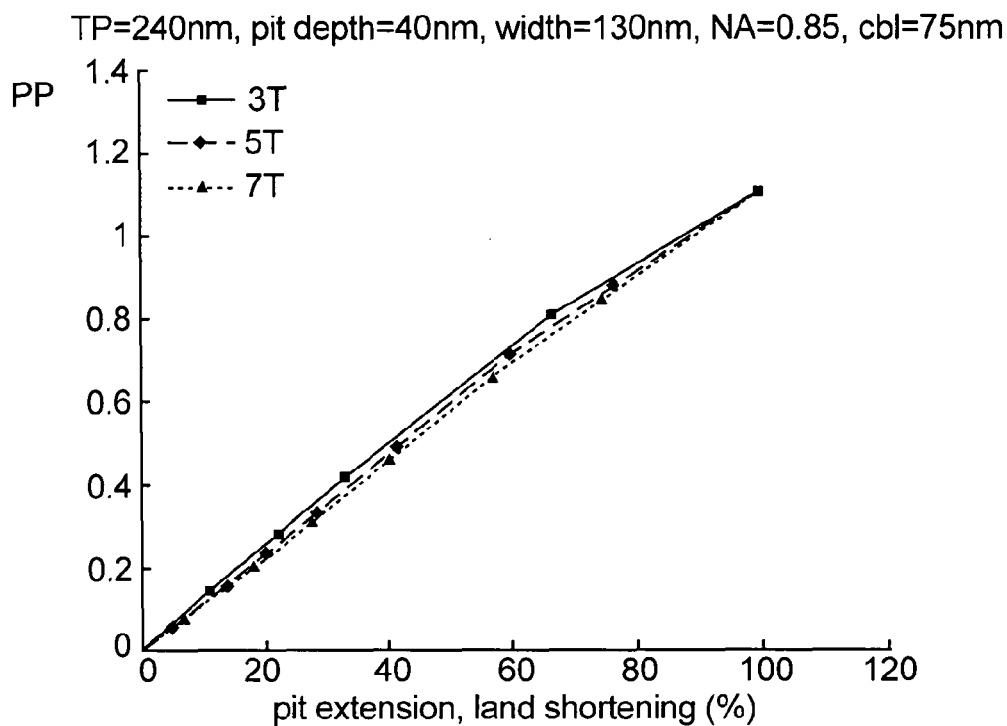

In FIG. 4 push/pull signals PP are shown for an optical disc comprising a track structure in accordance with FIG. 3. The push/pull signals PP are calculated by using a simulation, which included the values: track pitch TP=240 nm, pits with a pit depth of 40 nm and a width of 130 nm and a pickup comprising Blu-ray type optics with a numerical aperture NA=0.85 and a laser wavelength $\lambda$=405 nm. Push/pull signals PP were calculated for tracks having only pits and lands of length 3T, 5T or 7T with a channel bit length cbl=75 nm as a function of pit extension and land shortening for tracks $T_m$ and of land extension and pit shortening for tracks $T_n$ in percent. As shown in FIG. 4, the amplitudes of the push/pull signals increase with increased extension and shortening and is zero without pit extension and land shortening.

The push/pull signals PP are essentially independent of the sizes 3T, 5T, 7T of the pits and lands. An extension and shortening of pits and lands of 20% corresponding with a duty cycle of 60% provides a push/pull signal of about 0.2, which is sufficient for providing a stable push/pull tracking regulation. The track pitch of 240 nm provides an increase in data density of ⅓ with regard to the Blu-ray disc standard having a track pitch of 320 nm.

Figure 5:
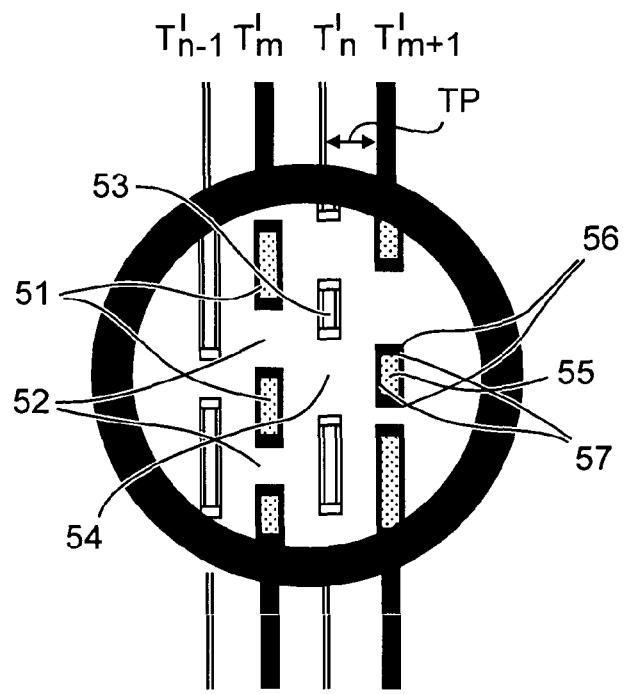

In a further aspect of the invention, marks 51 are enlarged in length and in width and spaces 52 are reduced in length for tracks $T'_m$ and marks 53 are reduced in length and in width and spaces 54 are enlarged in length for tracks $T'_n$ as shown in FIG. 5. The mark 55 of track $T'_{m+1}$ for example contains extensions 56 for enlarging the length and contains extensions 57 for enlarging the width, with regard to a defined channel bit length of a given channel modulation code. For example, a channel modulation code may be used including marks and spaces with sizes from 2T to 8T, where T is the channel bit length, similar to the Blue/Ray disc channel modulation code. For the channel bit length, for example a length of 40 nm or 50 nm may be used.

The structure of the marks and spaces changes therefore periodically for consecutive adjacent tracks $T'_m$, $T'_n$ between enlarged marks and shortened spaces, and reduced marks and enlarged spaces. With the track structure as shown in FIG. 5, the track pitch TP between adjacent tracks $T'_m$, $T'_n$ can be reduced correspondingly, in particular below the diffraction limit of $\lambda/2*NA$ of a pickup, by still providing a stable tracking regulation.

Figure 6:
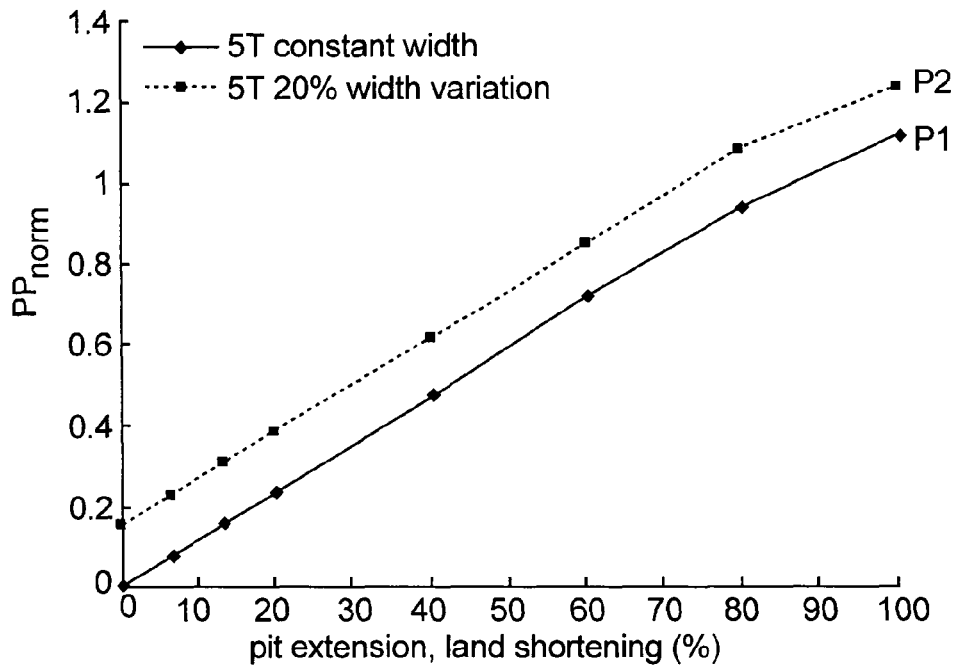

The track structure $T'_m$, $T'_n$ of FIG. 5 provides an increased push/pull signal for the same track pitch TP with regard to the track structure of FIG. 3, as shown in FIG. 6. FIG. 6 shows push/pull signals P1, P2 provided by a simulation using the values: track pitch TP=240 nm, pits with a pit depth of 40 nm and a width of 130 nm and a pickup with a numerical aperture NA=0.85 and a laser wavelength $\lambda$=405 nm, as used for the simulation of the FIG. 4.

The push/pull signal P1 shows the push/pull signal in dependency of the pit extension and land shortening of tracks $T_m$ and pit shortening and land extension of tracks $T_n$ for 5T pits, wherein the pits of all tracks have the same width, corresponding with the embodiment of FIG. 3. The push/pull signal P2 corresponds with the parameters for the push/pull signal P1, but includes pits, which are enlarged in addition in width for tracks $T'_m$, and pits reduced in addition in width for tracks $T'_n$, corresponding with the embodiment of FIG. 5, the widths variation being +/−20% with regard to the width of the pits as used for the simulation for the push/pull signal P1.

As can be seen, the additional variation of the width provides an increase of the push/pull signal. An increase of more than a factor of 2 can be obtained for the situation, when tracks have a pit extension and land shortening of 10% for tracks $T'_m$ and corresponding pit shortening and land extension for tracks $T'_n$. By using in addition a variation of the width of pits of a read only optical storage medium or of marks of a recordable optical storage medium, an increased push/pull signal can be obtained therefore, or alternatively, the track pitch can be reduced further for providing an increased data density of the optical storage medium.

The modification of the pits and lands with regard to the length has the disadvantage that the bit error rate increases when the modification is too large. But a modification of 10% would already provide a push/pull signal of more than 0.2 according to FIG. 6, which would be sufficient already for providing a stable tracking regulation. A modification of 10% corresponding with a duty cycle of 55% is particularly still compliant with the Blu-ray disc specification because the respective jitter contribution is only 5%.

The reduction of the width of marks of tracks $T'_m$ and increase of the width of marks $T'_n$ has the disadvantage that the HF data signal modulation is lower for the tracks having marks with reduced width and also for tracks having marks with increased width. But a modification of 20% in width as taken into account for the simulation of FIG. 6 still provides a sufficient HF signal. By using a modification of the length and width of marks and including a modification of the length of spaces, a reduction of the track pitch of the optical storage medium by a factor of 2 can be easily obtained, for providing an increased data capacity.

For a read only optical disc comprising pits, the production can be made by using a stamper comprising corresponding pits and lands. The stamper can be provided by manufacturing a master disc, which contains pits and lands recorded on the master disc for example by using electron beam mastering.

Figure 7A:
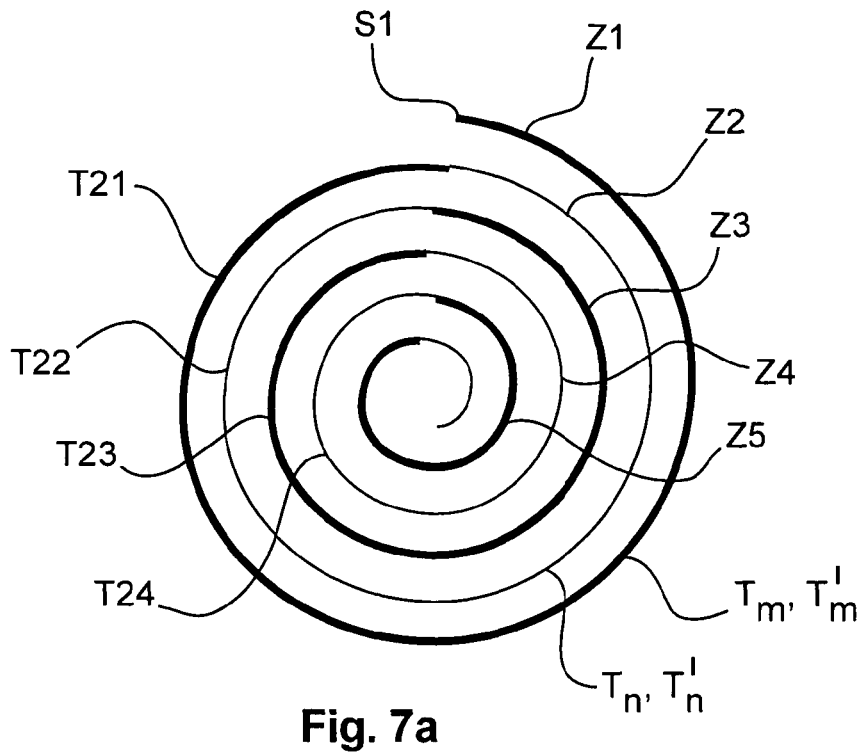

The track structures according to FIGS. 3 and 5 may be arranged on an optical disc in form of spirals, as known from a DVD or a Blu-Ray disc, or in form of circular rings or segments of circular rings, as known from a DVD-RAM. In FIG. 3a an embodiment of a track structure is shown in a simplified manner, in which tracks T21-T24, . . . are represented by one spiral S1 on an optical disc. To provide the requirement, that for consecutive adjacent tracks, the structure of the marks and spaces changes periodically between marks being enlarged in length and spaces being shortened in length, tracks $T_m$ or $T'_m$, and marks being shortened in length and spaces being enlarged in length, tracks $T_n$ or $T'_n$, the spiral S1 consists of segments Z1, Z2, . . . represented by tracks $T_m$ and $T'_m$. The spiral S1 is partitioned into sequences Z1, Z3, Z5, . . . , corresponding with tracks $T_m$ or $T'_m$, indicated by fat line segments, and interleaved sequences Z2, Z4, . . . corresponding with tracks $T_n$ or $T'_n$, indicated by thin line segments. When the length of each of the segments Z1-Z5 has the length of one revolution respectively 360°, the requirement is fulfilled, that structure of the marks and spaces changes periodically for consecutive adjacent tracks, as shown in FIG. 7a.

The length of the sequences Z1, Z2, . . . can be alternatively also smaller, and in particular, if successive sequences have a length of 1/(1+2n) of a perimeter of 360°, it can be easily shown that the requirement is also fulfilled, that the structure of the marks and spaces changes periodically between marks being enlarged in length and spaces being shortened in length, tracks $T_m$ or $T'_m$, and marks being shortened in length and spaces being enlarged in length, tracks $T_n$ or $T'_n$, when n=1, 2, 3, . . . . But an optical disc with shorter sequences is more difficult to master, and therefore sequences Z1, Z2, . . . having the length of the perimeter of 360° seem to be the optimum.

Figure 7B:
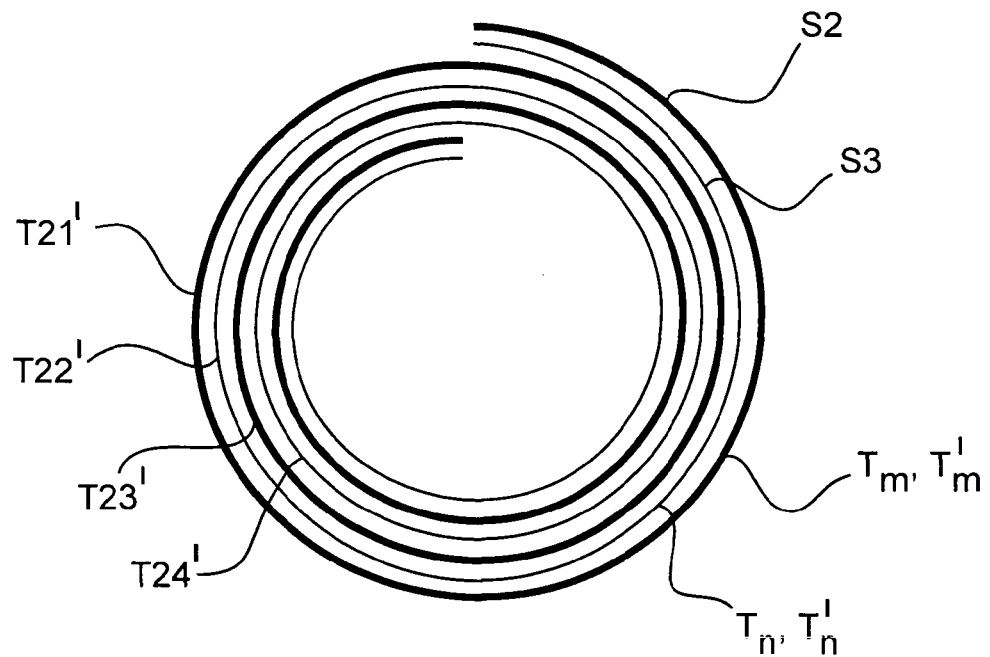

Another preferred embodiment of the optical storage medium 1 is shown in FIG. 7b in a simplified manner, in which tracks T21'-T24', etc. are arranged as two spirals S2, S3 on an optical disc. The first spiral S2 comprises marks and spaces in accordance with tracks $T_m$ or $T'_m$ and the second spiral S3 comprises marks and spaces in accordance with tracks $T_n$ or $T'_n$. The first spiral S2 is interleaved with the second spiral S3 such, that the tracks T21', T23' belong to the first spiral S2 and the tracks T22', T24' belong to the second spiral S3.

The optical storage medium 1 may be designed for example for operation with an apparatus comprising a pickup with a Blu-ray type optics providing a laser beam with a wavelength $\lambda$=405 nm and having a numerical aperture NA=0.85. The track pitch TP of adjacent tracks of the storage medium 1 is for example 160 or 200 nm, below the respective diffraction limit of $\lambda/2*NA$=238 nm for tracking regulation of the pickup. Because of the varying pit geometry, for the tracking regulation then only the periodic structure of tracks of same pit geometry is relevant with regard to the distance 2TP being above the diffraction limit of $\lambda/2*NA$.

An apparatus for reading of data of an optical storage medium in accordance with FIG. 2 comprises a pickup with a laser, a detector unit, and an objective lens for reading data from the optical storage medium, a tracking regulation and a data processing unit for decoding data of the tracks $T_m$ and $T_n$, and/or of the tracks $T'_m$ and $T'_n$ in accordance with the embodiments of FIG. 3 or 5. The data processing unit may include a compensation means for compensating the reduction and extension of the lengths of the marks and spaces for a better recognition and for reducing the jitter of the HF signal. The data processing unit includes advantageously also a selection means for selecting spiral S2 or spiral S3 in accordance with the embodiment of FIG. 7b, which may be made for example by changing the polarity of the tracking error signal.

The apparatus uses advantageously a three beam optical pickup, providing a center beam for reading of the data tracks and providing two satellite beams for utilizing a differential push-pull tracking method. For the satellite beams, a lower laser power can be selected with regard to the laser power of the center beam, for example the intensity of the two satellite beams is each smaller than 50% of the intensity of the main beam, because no super-resolution effect is required for generating the push-pull tracking signal. Therefore, a conventional differential push-pull grating can be used within the pickup to generate the three beams, wherein the satellite beams have a lower power than the center beam, and wherein the radial distance of the spots as provided on the optical disc is −TP between the first satellite beam and the center beam and +TP between the center beam and the second satellite beam.

Figure 8:
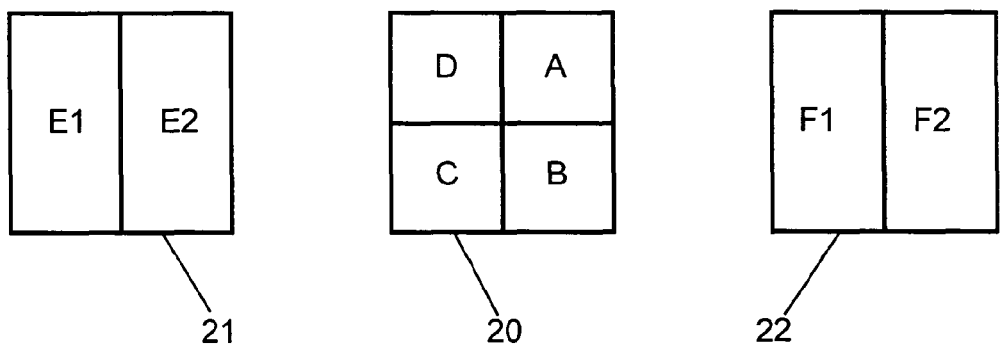

A detector unit, which can be used advantageously for providing such a push-pull tracking signal, as well as for providing a data signal and a focus error signal, is shown in FIG. 8. The detector unit comprises a four-quadrant detector 20 with four segments A, B, C, D for detecting light from the center beam as reflected from the optical disc. A second detector 21 is provided for the reflected light from the first satellite beam and for reflected light from the second satellite beam a third detector 22, which are each split into two halves with regard to the radial direction of the optical disc. Detector 21 is split into two equal segments E1, E2 and detector 22 into two equal segments F1, F2, and the geometrical arrangement of the detectors 20-22 inside the pickup is made such that the reflected light from the main beam is centered on detector 20, reflected light from the first satellite beam centered on detector 21 and reflected light from the second satellite beam centered on detector 22.

The segments A-F2 are photosensitive elements as known from prior art. They provide corresponding electrical signals a1, b1, c1, d1, e1, e2, f1, f2, from which a differential push-pull tracking signal TE for correcting the tracking error of the pickup can be calculated according to the following formula:

$$TE=((a1+b1)-(c1+d1))-\gamma((e2-e1)+(f2-f1))$$

The factor $\gamma$ is needed to compensate the lower signals from the satellite detectors E1, E2, F1, F2 which are caused by the lower amplitudes of the satellite beams. The four segments A-D are further used to provide the HF data signal and the focus error signal for focus regulation. Alternatively, only the signals e1, e2, f1, f2 from the satellite beams may be used for providing a push-pull tracking signal according to the following formula:

$$TE=(e2-e1)+(f2-f1)$$

For reading the data of an optical ROM disc in accordance with the embodiment shown in FIG. 7b, the apparatus reads for example the first spiral S2 up to the end, and then the second spiral S3. For this the pickup has to be repositioned to the beginning of the second spiral S3. Alternatively, the pickup reads a certain number of tracks of spiral S2, then the actuator of the pickup moves back a few tracks, preferably without moving the whole pickup, and reads the same number of tracks of spiral S3 and so on. By this approach a quasi-continuous reading of the whole disc can be realized.

The track structures of the invention as explained with regard to FIGS. 3 and 5 can be applied in particular to a Super-RENS ROM disc, comprising a mask layer with a super resolution structure. The track pitch is advantageously below 240 nm for use with an optical pickup having a laser emitting light with a wavelength of e.g. about 405 nm. But also other embodiments may be utilized by a person skilled in the art without departing from the spirit and scope of the present invention. The track structures of the invention may be applied for example also to other present or future optical discs not including a nonlinear layer for a reduction of the track pitch, and the invention may be used also for writable and re-writable optical storage media. The invention resides therefore in the claims herein after appended.

The invention claimed is:

1. Optical storage medium comprising a substrate layer, a data layer disposed on the substrate layer and a nonlinear layer with a super resolution structure being arranged above the data layer for providing a super-resolution effect,
the data layer having a mark/space data structure being arranged in tracks, each track having marks and spaces of different lengths in accordance with a given channel modulation code, wherein
for consecutive adjacent tracks, the structure of the marks and spaces changes periodically between a track having marks being enlarged in length and in width and spaces being shortened in length with regard to said channel modulation code, and of an adjacent track having marks being shortened in length and in width and spaces being enlarged in length with regard to said channel modulation code.

2. The optical storage medium of claim 1, wherein the marks and the spaces are enlarged in length and shortened in length with regard to a defined channel bit length of said channel modulation code.

3. The optical storage medium of claim 1, wherein the marks are enlarged in length and the spaces are shortened in length of a first kind of tracks and the marks are shortened in length and the spaces are enlarged in length of interleaved tracks such, that a push-pull tracking error signal with an amplitude being within an interval of 0.10-0.35 is obtained.

4. The optical storage medium of claim 1, wherein the optical storage medium is a read-only optical disc comprising pits and lands as the marks and spaces, and wherein tracks having pits enlarged in length and lands shortened in length provide groove-kind tracks having pits representing a pit/land duty cycle being within a range of 55%-70% and tracks having pits shortened in length and lands enlarged in length provide land-kind tracks having lands representing a pit/land duty cycle being within a range of 55%-70%.

5. The optical storage medium of claim 1, wherein the track pitch between adjacent tracks is in a range or below a diffraction limit of $\lambda/2*NA$ of a pickup for reading of the data.

6. The optical storage medium of claim 1, wherein the track pitch between adjacent tracks is within a range of $f\lambda/2*NA$ and of $\lambda/4*NA$.

7. Apparatus comprising a pickup with a laser, a detector unit and an objective lens for reading data from an optical storage medium in accordance with claim 1, the apparatus comprising a data processing unit for decoding data of tracks having marks enlarged in length and the spaces shortened in length, and tracks having marks shortened in length and spaces enlarged in length, wherein
the pickup provides a center beam and two satellite beams for providing a HF data signal and a tracking error signal, the three beams being focused by the objective lens onto the optical storage medium, and reflected light from the optical storage medium being guided onto the detector unit; and
the center beam being adjustable onto a track of the optical storage medium for reading of the data, and wherein a first of the satellite beams is adjusted onto a first adjacent track and the second satellite beam is adjusted onto the second adjacent track when the center beam is adjusted onto said track, and wherein the intensity of the two satellite beams is each smaller than 50% of the intensity of the main beam.

8. The apparatus of claim 7, wherein the detector unit comprises a center detector for detecting reflected light from the center beam and two satellite detectors for detecting reflected light from the satellite beams, the two satellite detectors being divided each into two segments , and the pickup providing a push-pull tracking signal for tracking regulation in response to the two satellite detectors, or providing a push-pull tracking signal for tracking regulation in response to the center detector.

9. The apparatus of claim 8, wherein the tracking error signal (TE) is calculated by taking into account the relation TE=(e1−e2)+(f1−f2), e1, e2, f1, f2 being electrical signals from the four segments (E1, E2, F1, F2) of the two satellite detectors.

10. The apparatus of claim 7, wherein the data processing unit includes compensation means for compensating the reduction and extension of the lengths of the marks and spaces.

* * * * *